United States Patent [19]

Gehmann

[11] Patent Number: 5,200,852
[45] Date of Patent: Apr. 6, 1993

[54] DIOPTRIC SIGHT

[76] Inventor: Walter Gehmann, Karlstrasse 40, 7500 Karlsruhe, Fed. Rep. of Germany

[21] Appl. No.: 745,179

[22] Filed: Aug. 15, 1991

[30] Foreign Application Priority Data

Sep. 3, 1990 [DE] Fed. Rep. of Germany ....... 4027854

[51] Int. Cl.$^5$ .......................... G02B 23/00; G02B 7/02; F41G 1/02
[52] U.S. Cl. .................................... 359/399; 359/819; 359/892; 33/251
[58] Field of Search ................................ 359/227–236, 359/399–406, 419–429, 885–894, 502, 362–367, 808–819, 827–830; 33/233–263; 356/247, 2; 250/467.1, 482.1

[56] References Cited

U.S. PATENT DOCUMENTS

| 4,043,646 | 8/1977 | Heine et al. ............................ 359/892 |
| 4,392,723 | 7/1983 | Gehmann ............................... 359/502 |
| 4,536,057 | 8/1985 | Sumi et al. ............................ 359/892 |
| 4,684,231 | 8/1987 | Athy ..................................... 359/892 |
| 4,856,879 | 8/1989 | Gehmann ............................... 359/502 |

FOREIGN PATENT DOCUMENTS

| 1919031 | 10/1970 | Fed. Rep. of Germany ........ 33/251 |
| 3018488 | 11/1981 | Fed. Rep. of Germany ...... 359/892 |
| 38548 | 3/1980 | Japan ................................... 359/502 |

Primary Examiner—Bruce Y. Arnold
Assistant Examiner—Thong Nguyen
Attorney, Agent, or Firm—Klaus J. Bach

[57] ABSTRACT

In a dioptric sight having a tubular body with an eyepiece including an adjustable iris diaphragm mounted on one end thereof and a plastic sleeve mounted on the eyepiece, the tubular body and the sleeve each has at least one transverse slot formed therein for receiving filter discs of a diameter corresponding to the diameter of the tubular body, the filter discs being lockable in the slots but being easily removable for cleaning and exchange.

16 Claims, 2 Drawing Sheets

DIOPTRIC SIGHT

BACKGROUND OF THE INVENTION

The invention relates to a dioptric sight including an adjustable iris diaphragm and a plurality of color and-/or polarization filters.

Such dioptric sights are described, for example, in U.S. Pat. Nos. 4,856,879 and 4,392,723.

In the arrangements described in these patents as well as in other known arrangements, the color filter discs and polarizing discs have a diameter of only about 4 mm corresponding to the sight channel of the eyepiece. The small size of the filter discs; however, permits only insufficient cleaning of the discs since, with the usual cleaning procedures, a circumferential rim of dirt remains at the outer edge of the disc which may obstruct the view. This is also true for the arrangement according to U.S. Pat. No. 4,856,879 in which disassembly and removal of the discs for cleaning is easily possible. Practice also shows that, because of their small size, the cleaned filter discs are easily contaminated which may happen just by grasping the discs. The small discs permit a highly compact sight design which however in practice encounters some problems particularly with regard to the servicing of the filter discs.

It is further pointed out in the above-cited patent that dioptric sights of the type described are needed in relatively large numbers and that, therefore, they should be designed such that they can be manufactured in an economical manner. Although the dioptric sight described in that patent can in fact be economically manufactured, practice has shown that the design is still too expensive for most hunters; they would generally prefer a more simple, less expensive sight.

It is the principal object of the present invention to provide a dioptric sight design with filter discs which can be easily removed and reinstalled so that they can be properly cleaned and with design features which permit easy and inexpensive manufacture.

SUMMARY OF THE INVENTION

A dioptric sight which has a tubular body portion with an eyepiece including an adjustable iris diaphragm mounted on one of its ends and a plastic sleeve mounted on the eyepiece has at least one transverse slot formed in the body portion and in the eyepiece for receiving filter discs of a diameter corresponding to the diameter of the tubular body portion and are easily removed and easy to handle for cleaning.

In contrast to the arrangement described before, wherein small filter discs of about 4 mm diameter are disposed in a mounting frame which is rotatably supported in the main sight body, filter discs of a diameter corresponding about to the inner diameter of the sight body can be inserted into transverse slots formed in the sight body. These relatively large filter discs are so arranged that they can be easily removed, cleaned and reinserted. Possibly contaminated edges between the filters and the filter frames are of little importance since the edge areas are relatively small compared to the whole filter area. Also, the number of filters used is no longer limited by the diameter of a rotatable frame structure to be disposed within the sight body but any desired number of filters, color or polarization filters, may be utilized. Any desired color filter disc may be inserted in a particular transverse slot with such an arrangement while a polarization filter disc may be inserted into another slot and another polarization filter disc may be inserted into the sleeve. Insertion of the filter discs into the main sight body or the sleeve can be accomplished without touching the filter disc surfaces, that is, without contaminating the discs, so that the disadvantages of the earlier dioptric sights, that is, the difficult removal and reinstallation of the filter discs and particularly their problematic cleaning, have been eliminated. It is pointed out that manufacture of the main body as well as manufacture of the filter discs can be accomplished very economically so that a dioptric sight in accordance with the present invention should be relatively inexpensive.

Preferably the filter discs consist simply of a filter mounted in an annular frame so that a hunter or target shooter may assemble his own filters in accordance with his own needs. This is particularly advantageous if the filter is also utilized to correct a vision problem of the shooter. Particularly in order to facilitate adjustment of an optically corrected filter disc to a particular reference orientation it is proposed that the annular frame is provided with a retaining pin. Such a pin is also suitable for rotating the polarization filter discs in the transverse slots or in the sleeve by about 50°. It is also possible to provide the filter discs with a handle which is particularly advantageous for insertion and removal of the filter discs into and from the sleeve. Also, the filter discs may have plastic frames into which the filters are firmly molded.

For locking the filter discs in position in the transverse slots, open leaf springs are disposed around the main tubular sight body so as to cover the transverse slots. They also may have one of their ends mounted to the sight body. Particularly with such an arrangement it is advantageous that polarization filter discs with support pins have the pins engaged by the edges of the springs and are held in the desired pivot position by the springs. If index positioning is desirable, as might be the case for eyesight correcting filter discs, the leaf springs may have notches formed at their side edges for receiving the support pin and retaining it in position.

It is also within the scope of the present invention that not only one but more than one filter discs are disposed in a transverse slot. Preferably these filter discs are then held in position in the tubular main body of the sight by a spring-loaded slidable sleeve which resiliently engages the filter discs. An index-type retaining structure may be provided on the sides of the filter disc frames which may include notches and projections or serrations.

In another embodiment the filter discs are supported at one side on the outside of the tubular central body such that they can be piboted into the transverse slots. It is also possible to combine a number of filter discs in a support ring structure which is rotatably supported for movement through the transverse slots. These arrangements have the advantage that the filter discs are always connected to the dioptric sight and are therefore always available. If a large number of filter discs is to be provided, two or even more such support ring structures may be disposed in side-by-side relationship.

Finally it is possible to mount a filter disc in the front opening of the slidable sleeve. If such sleeve consists of an elastic material and its opening has essentially the same diameter as the tubular main body, the filter disc is retained in the resilient sleeve material without the need for any additional retaining structure.

DESCRIPTION OF PREFERRED EMBODIMENTS

Figure 1:
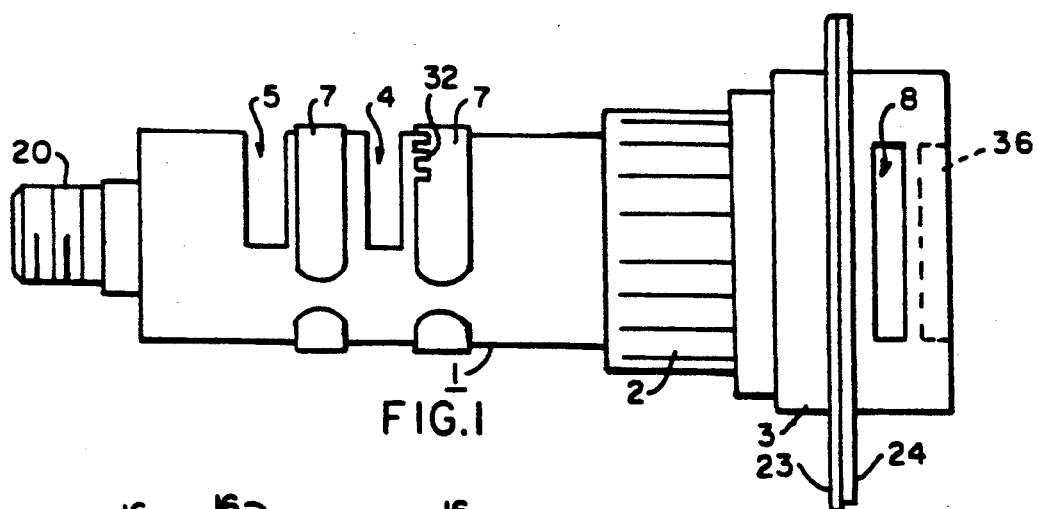
FIG. 1 is a side view of the sight in accordance with one embodiment.

As shown in FIG. 1 the dioptric sight includes a tubular central body 1 which carries at one of its ends an eyepiece with an adjustable iris diaphragm structure 2. A sleeve 3 is disposed on the eyepiece and cover discs 23, 24 are pivotally supported in the eyepiece. At its opposite end, the tubular central body 1 is provided with a threaded stub 20 for mounting the sight onto its support.

Figure 3:
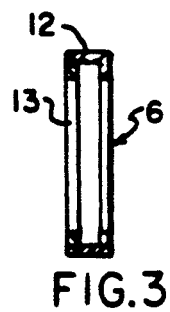
FIG. 3 shows a filter disc in cross-section.
Figure 4:
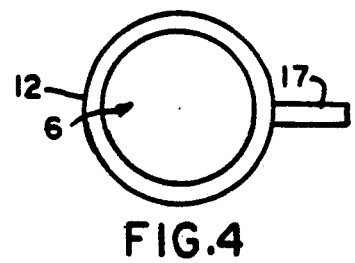
FIG. 4 is a planar view of the filter disc shown in FIG. 3.

The tubular main body 1 has formed therein transverse slots 4, 5 into which filter discs 6 (FIGS. 3, 4) can be inserted. The filter discs 6 are retained in the transverse slots 4, 5 by annularly bent leaf springs 7 which are moved over the transverse slots 4, 5, such that the filter discs 6 are retained in position in the slots 4, 5.

Figure 2:
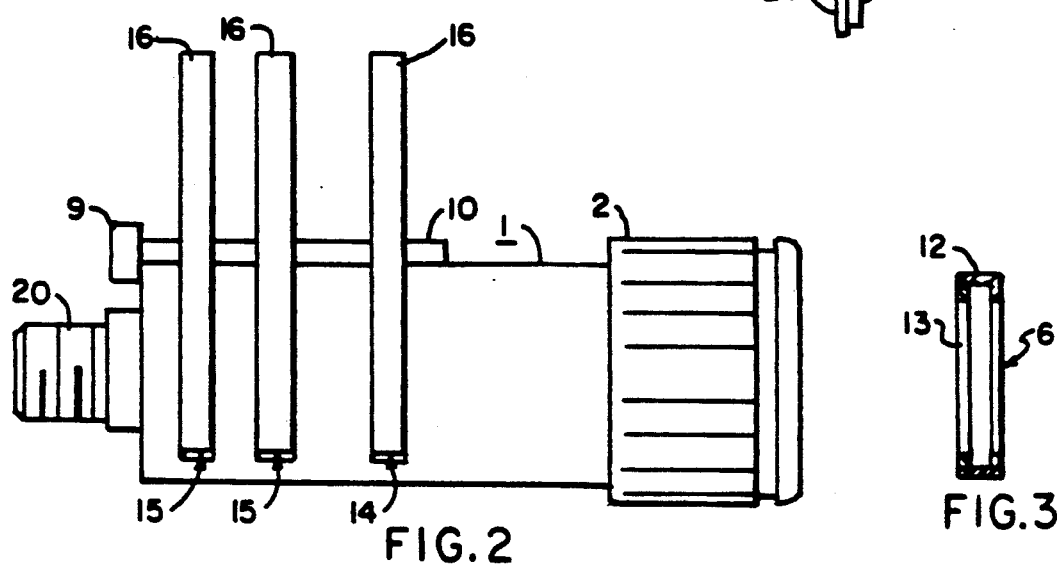
FIG. 2 is the same view of another embodiment.
Figure 6:
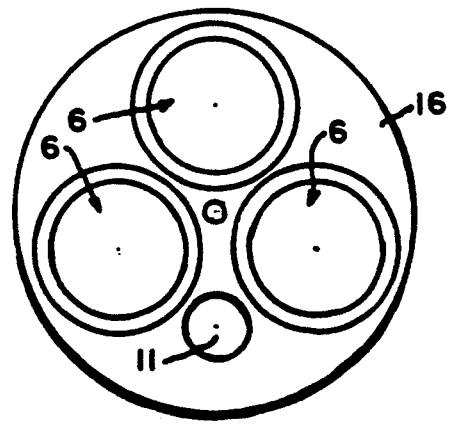
FIG. 6 shows a filter disc support ring.
Figure 5:
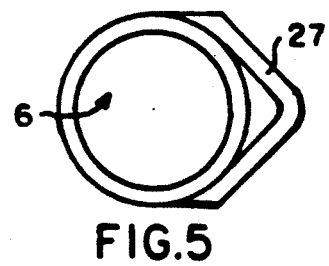
FIG. 5 shows another embodiment of a filter disc.

An additional filter disc 6 may be inserted into a transverse slot 8 formed in the sleeve 3. If the slot 8 is properly sized, the filter disc 6 is retained in position in the sleeve 3 without any particular locking structure since the sleeve consists of an elastic material and therefore engages the disc. Preferably the slot 8 in the sleeve 3 is a through-slot in order to permit expulsion of a filter disc or replacement of a filter disc by another. In order to facilitate insertion and removal of filter discs 6 from the slot 8, the filter disc may have a handle 27 formed at one side thereof as shown in FIG. 5. Also, a filter disc 6 may be disposed in the front opening 36 of the sleeve 3 so as to be snugly received therein. In an embodiment as shown in FIG. 2, a number of filter discs 6 are arranged in a filter support ring structure 16 (FIG. 6) which is rotatably supported on the tubular central body 1 by means of a pin 9 such that the support ring structure 16 extends deep into the transverse slots 14, 15 formed in the body 1. The pin 9 can be pulled out of its guide hole 10 so that the filter ring structures 16 are released and can be removed. As shown, each filter ring structure includes three filter discs 6 and a passage 11 which is moved into the tubular body whenever the user does not need any filter disc. The opening 11 needs to be only large enough so that it will not inhibit the view through the sight, that is, it does not need to have the same diameter as the filter discs 6. Preferably indexing means are arranged in the support structure for the filter disc rings 16 which retain the filter disc rings in a particular desired angular position.

The filters may be removably disposed in the filter discs 6 or in the filter support rings 16 in order to permit installation of different filters (color filters, polarization filters, optical lenses). In order to facilitate an exchange, the filter disc 6 preferably consists of an annular internally threaded frame 12 provided with an internal collar and a retaining ring 13 threaded into the frame 12 with the filters disposed between the collar and the ring. In order to facilitate pivoting of a polarization filter or optical lenses the annular frame 12 may be provided with a handling pin 17. For index positioning of filters 6 with handling pins 17 the leaf springs 7 may have recesses 32 formed at their side edges for receiving and locating the handling pins 17.

Figure 7:
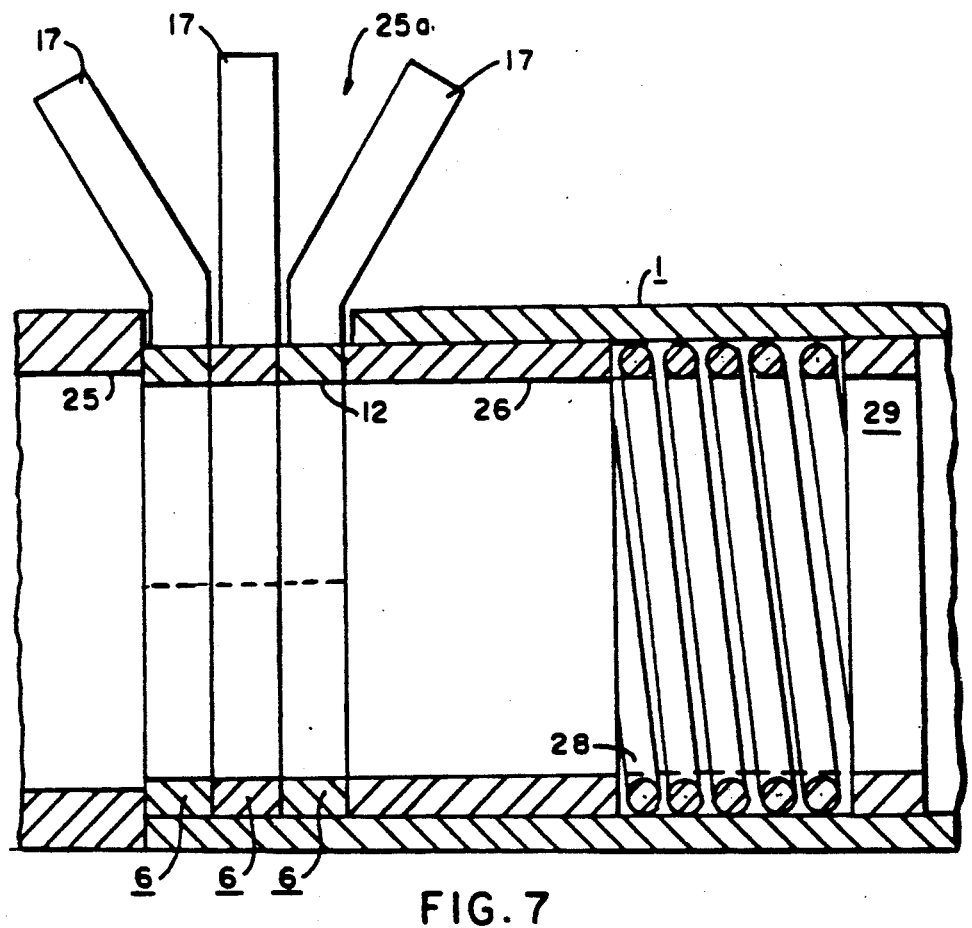
FIG. 7 is a partial cross-sectional view of a sight body with a wide disc receiving slot and engagement sleeve.
Figure 8A:
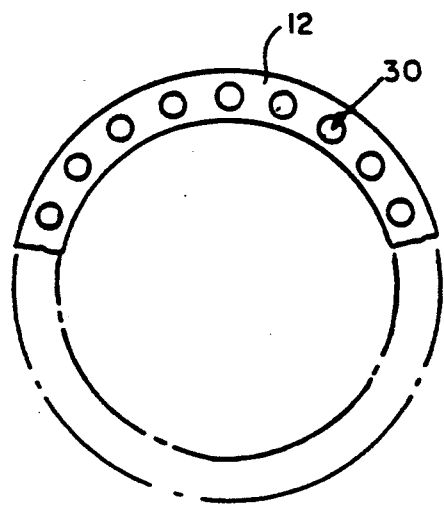
FIGS. 8A and 8B are side views of a filter disc frame showing different retaining means.
Figure 8B:
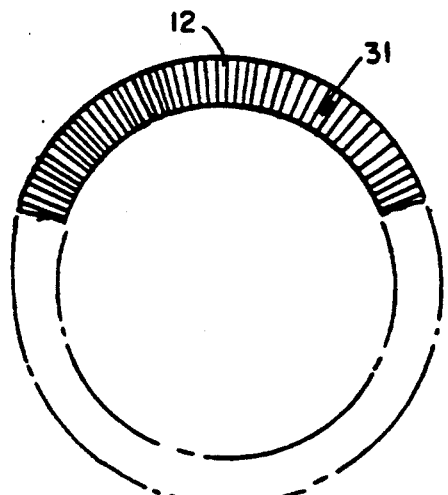

FIG. 7 finally shows an arrangement with a relatively wide transverse slot 25a in which three filter support discs 6 are disposed side-by-side. The outer filter discs have bent-over handling pins 17 so that each of them can be grasped individually. At one side the filter disc pack abuts a shoulder 25 in the tubular main body 1 and at the opposite side the filter disc pack is engaged by a sliding sleeve 26 biased by a coil spring 28. The coil spring 28 is disposed between the sliding sleeve 26 and a threaded ring 29 which is threaded into the tubular main body 1. With the filter discs 16 or their frames 12 already exposed to a spring load, the frames 12 may be provided with projections and recesses 30 or they may be serrated as indicated at 31 in order to prevent undesired pivoting thereof in the filter disc planes. Also as indicated in FIG. 1, the leaf spring 7 may have recesses 32 formed along one side edge which recesses are adapted to receive handling pins 17 for locating the filter discs 6 in a given angular position.

What is claimed is:

1. A dioptric sight comprising a tubular body portion, an eyepiece mounted on one end of said body portion, an elastic material sleeve for mounting on said eyepiece, said tubular body portion and said sleeve each having at least one transverse slot formed therein with each slot receiving at least one filter disc of a diameter corresponding to the diameter of said tubular body portion and consisting of a filter disposed in an annular frame, said annular frame being internally threaded and having an internal collar formed at one side and a retaining ring threaded into the frame from the other side with the filter disposed between the collar and the retaining ring, and means for locking said filter discs in position in said slots.

2. A sight according to claim 1, wherein said frame consists of plastic molded around said filter.

3. A sight according to claim 1, wherein said annular frame is provided with projections and recesses or is serrated to facilitate locking of said filter discs in given angular positions.

4. A sight according to claim 1, wherein an essentially radially projecting handling pin is mounted on said annular frame.

5. A sight according to claim 1, wherein said frame includes a handle for grasping said filter disc.

6. A sight according to claim 1, wherein a slide sleeve is resiliently supported within said tubular body portion so as to be spring biased toward said transverse slot for engagement of any filter disc disposed in said transverse slot.

7. A sight according to claim 1, wherein said filter discs are pivotally supported on the outside of said tubular body portion for pivoting said filter discs into, and out of, said transverse slots.

8. A sight according to claim 7, wherein at least two filter discs are mounted on a support ring in an annular array, said support ring being rotatably supported on said tubular body portion so as to extend into a transverse slot in said tubular body for moving the filter discs on said support ring into position in said transverse slot.

9. A dioptric sight comprising a tubular body portion, an eyepiece mounted on one end of said body portion, an elastic material sleeve mounted on said eyepiece and including at least one cover disc pivotally supported in said sleeve, and said tubular body portion including at least one color filter disc and at least one polarization filter disc, each filter disc having a diameter corresponding to the diameter of said tubular body portion, and said elastic material sleeve having a front opening adapted to engageably receive at least one filter disc.

10. A dioptric sight comprising a tubular body portion, an eyepiece mounted on one end of said body portion, an elastic material sleeve for mounting on said eyepiece, said tubular body portion and said sleeve each having at least one transverse slot formed therein with each slot receiving at least one filter disc of a diameter corresponding to the diameter of said tubular body portion, and an open circular leaf spring disposed around said tubular body portion so as to overlie said at least one transverse slot therein for retaining any filter disc in said slot.

11. A sight according to claim 10, wherein said leaf spring has one end mounted to said tubular body.

12. A sight according to claim 10, wherein said leaf spring has recesses formed along one side edge thereof.

13. A sight according to claim 12, wherein an essentially radially projecting handling pin is mounted on said filter disc and adapted to be received in the recesses of said leaf spring.

14. A sight according to claim 10, wherein a slide sleeve is resiliently supported within said tubular body portion so as to be spring biased toward said transverse slot for engagement of any filter disc disposed in said transverse slot.

15. A sight according to claim 10, wherein said filter discs are pivotally supported on the outside of said tubular body portion for pivoting said filter discs into, and out of, said transverse slots.

16. A sight according to claim 15, wherein at least two filter discs are mounted on a support ring in an annular array, said support ring being rotatably supported on said tubular body portion so as to extend into a transverse slot in said tubular body portion for moving the filter discs on said support ring into position in said transverse slot.

* * * * *